Figure 1:
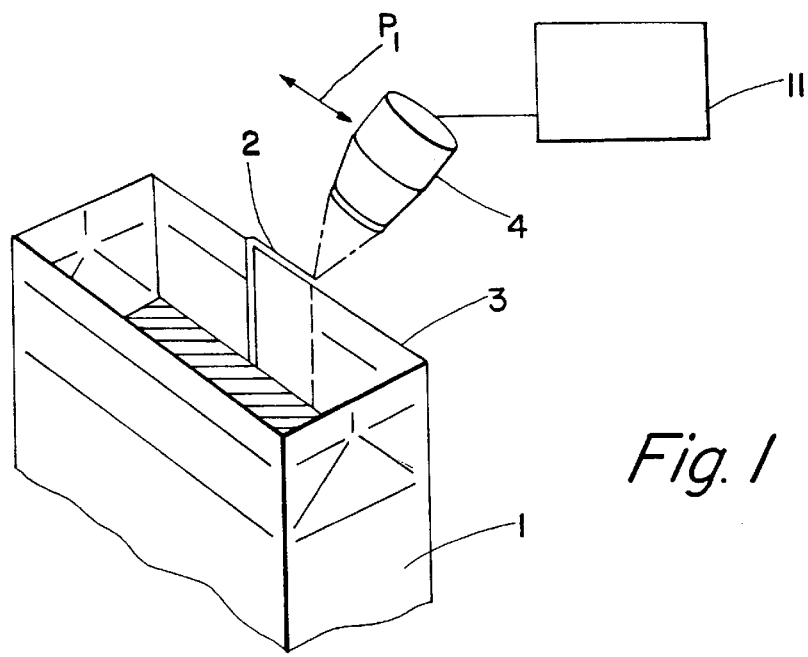

United States Patent

Bömer et al.

Patent Number: 5,924,267
Date of Patent: Jul. 20, 1999

[54] PROCESS AND A DEVICE FOR CLOSING FILLED FOLDED-CARTON PACKAGES

[75] Inventors: Hans Bömer, Erkrath; Hans-Willi Mainz, Heinsberg, both of Germany

[73] Assignee: SIG Combibloc GmbH, Linnich, Germany

[21] Appl. No.: 08/860,914

[22] PCT Filed: Jan. 12, 1996

[86] PCT No.: PCT/EP96/00119

§ 371 Date: Sep. 26, 1997

§ 102(e) Date: Sep. 26, 1997

[87] PCT Pub. No.: WO96/21595

PCT Pub. Date: Jul. 18, 1996

[30] Foreign Application Priority Data

Jan. 14, 1995 [DE] Germany ............... 195 00 971

[51] Int. Cl.$^6$ .................. B65B 7/08; B65B 57/02
[52] U.S. Cl. .................. 53/482; 53/75
[58] Field of Search .............. 53/75, 482, 371.2, 53/370.7, 377.7, 371.7, 372.2, 372.5, 372.7, 374.7, 375.2, 375.5, 375.7

[56] References Cited

U.S. PATENT DOCUMENTS

| | | | |
|---|---|---|---|
| 4,091,597 | 5/1978 | Sanderson et al. | 53/75 |
| 4,132,052 | 1/1979 | Larson | 53/75 |
| 4,295,322 | 10/1981 | Kuipers | 53/450 |
| 4,617,782 | 10/1986 | Mattei et al. | 53/482 |
| 4,825,623 | 5/1989 | Ross | 53/75 |
| 5,138,815 | 8/1992 | Groschen, Jr. | 53/55 |
| 5,147,491 | 9/1992 | Thomas et al. | 53/75 |
| 5,377,474 | 1/1995 | Kovacs et al. | 53/64 |
| 5,438,814 | 8/1995 | Lovett et al. | 53/75 |

FOREIGN PATENT DOCUMENTS 1509622  5/1978  United Kingdom.

Primary Examiner—Jessica J. Harrison
Assistant Examiner—John Paradiso
Attorney, Agent, or Firm—Standley & Gilcrest

[57] ABSTRACT

Shown and described is a process for closing filled open-top folded-carton packages (1) made from bottom-sealed tubular sections, whereby closing is by ultrasonic welding by means of an anvil (5) comprising a recess for the longitudinal seam (2) of the folded-carton package (1), and a sonotrode (6), and a device for filling such folded-carton packages (1) and closing the gable seam (8). Optimal tightness of the filled folded-carton packages (1) is achieved by position-acquisition of the longitudinal seam (2) of every folded-carton package (1) in relation to the cell transporting this folded-carton package (1), alignment of the anvil across the direction of transport of the folded-carton packages (1) until the recess for the longitudinal seam (2) matches the actual position of the longitudinal seam (2) of the next folded-carton package (1) to be closed, and sealing and folding over the gable seam (8) or the ridge seam respectively. The respective device is characterized in that a device for position-acquisition of the longitudinal seam (2) of a folded-carton package (1) in relation to the cell transporting the folded-carton package (1) is provided; that the anvil (5) is adjustable across the direction of transport of the folded-carton package (1) and that a control unit for alignment of the anvil (5) in relation to the longitudinal seam (2) of the folded-carton package (1) to be sealed is provided.

11 Claims, 1 Drawing Sheet

PROCESS AND A DEVICE FOR CLOSING FILLED FOLDED-CARTON PACKAGES

The invention first of all relates to a process for closing filled open-top folded-carton packages made from bottom-sealed tubular sections, whereby closing is by sealing and folding over the gable seam or the ridge seam respectively, by ultrasonic welding by means of an anvil comprising a recess for the longitudinal seam of the folded-carton package and a sonotrode.

In addition, the invention relates to a device for filling such folded-carton packages and closing the gable seam, with a supply unit for the tubular sections, a prefolding unit, a filling unit, a closing unit comprising an anvil and a sonotrode, and transfer and transport devices for the folded-carton packages, whereby the anvil has a recess for the longitudinal seam of the folded-carton package.

Cuboid flat-gabled packages and processes for their closure are known (GB-PS 15 09 622) which are predominantly used in the area of packaging of liquids, with normal cold, cold-sterile, hot, and aseptic filling. In this process, an attempt is made to close the packages immediately after filling in order to reliably prevent any possibility of contamination of the contents of the package.

It is known to shape folded carton cutouts provided with folding grooves, glued together to a tubular section, for example on a rotating mandrel wheel with radially arranged mandrels of rectangular shape, and to close them at the bottom end with a seal. In this process, cardboard composite material able to be hot sealed is used as a cutout material. The folded-carton containers made in this way, which are bottom-sealed and open at one end, are taken off the mandrels by a transfer station and placed on a level and straight-line transport device comprising numerous cells. This transport device transports the containers in a row, step by step, at first through a sterilising station and further downstream through one or several product outlets arranged behind each other at the distance of the containers. Once the folded-carton packages have been filled, the packages must be closed at their top end by sealing the so-called ridge seam or gable seam. To this end, first the upper area of the folded-carton package is prefolded into a ridge seam. Actual welding of the ridge seam formed in this way is by way of an anvil and sonotrode.

In order to be able to guarantee optimal tightness of the package, ultrasonic welding must occur with a certain pressure and with precisely positioned welding equipment, so that the area of the folded-carton package containing the longitudinal seam in the ridge seam or gable seam, too, can be reliably sealed. From practical application it is already known to provide the anvil in the area of this longitudinal seam with a recess, in order to enable optimal sealing of the gable seam. In this way, excessive surface pressure in the area of the longitudinal seam can be avoided.

If however the position of the recess in the anvil does not exactly match the true position of the longitudinal seam of the folded-carton package, then on one side of the longitudinal seam so-called "channel formation" and on the other side burn marks as a result of excessive surface pressure occur. This can lead to lack of tightness of the package in the area of the welding seam closing the top of the package. Increasing the sealing pressure or the welding time may not satisfactorily solve the disadvantages described above.

It is thus the object of the invention to embody and improve the process for closing filled folded-carton packages, and the respective device, in such a way that the above-mentioned disadvantages are avoided with certainty, in order to achieve optimal tightness of the filled folded-carton packages.

With regard to the process, this object is met in that prior to ultrasonic treatment of the package, the following steps are carried out:
 Position-acquisition of the longitudinal seam of every folded-carton package in relation to a cell transporting the folded-carton package, and
 Alignment of the anvil across the direction of transport of the folded-carton packages until the recess for the longitudinal seam matches the actual position of the longitudinal seam of the next folded-carton package to be closed.

From the point of view of the device, the object is met in that a device for position-acquisition of the longitudinal seam of a folded-carton package in relation to a cell transporting the package is provided; that the anvil is adjustable across the direction of transport of the folded-carton package and that a control unit for alignment of the anvil in relation to the longitudinal seam of the folded-carton package to be sealed is provided.

The process and/or the device according to the invention are particularly advantageous, because they allow optimal alignment of the longitudinal seam and the anvil recess with little construction effort. In addition, monitoring of package cells at the filling machine is possible as a result of the respective position of the longitudinal seam.

Since the filled packages are arranged on the cell of the transport unit without any shifting of the position being possible, it is imaginable that the position-acquisition of the longitudinal seam of the folded-carton package takes place immediately before or after the filling process.

However, it is also imaginable that the position-acquisition of the longitudinal seam of the folded-carton package takes place only in the sealing position of the gable seam. The second alternative is particularly advantageous because any shifting in the position of the folded-carton package due to whatever extraneous effect is reliably excluded.

For position-acquisition of the longitudinal seam of the folded-carton package, a preferred embodiment of the invention provides a tactile head which moves, across the direction of transport, along the upright package wall with the longitudinal seam, and conveys the positions determined to a control unit. In a preferred further development, the control unit can be a micro processor. The actual adjustment of the anvil takes place on the basis of the signals received by the control unit. Preferably a stepping motor is used to drive the anvil.

In order to reduce the tension within the gable seam, in particular due to the ears folded back laterally, according to a further embodiment of the invention, sealing of the gable seam takes place after folding over the prefolded gable seam, at an angle diverging from vertical, preferably at 30° to 60° to vertical. In this it is particularly suitable if the anvil has a wedge-shaped cross section, in order to be able to reach the "gusset area" between the package gable and the package top.

Below, the invention is illustrated in more detail by means of a drawing showing one preferred exemplary embodiment only. In the drawing FIG. 1 shows a first part of the device according to the invention in perspective view, and FIG. 2 shows a further part of the device according to the invention in perspective view.

FIG. 1 shows schematically a folded-carton package 1 of which only the upper area is shown, with a side wall 3 comprising a longitudinal seam 2. This is a folded-carton package 1 which has already been filled and is just about to be sealed, i.e. whose open top area is about to be closed.

For position-acquisition of the longitudinal seam 2 of the folded-carton package 1 in relation to the cell (not shown) transporting the folded-carton package 1, a tactile head 4 is provided which can be moved in a linear way across the double arrow $P_1$, in order to determine the exact length and position of the longitudinal seam 2. The data determined by the tactile head 4 are conveyed to a control unit 11.

Figure 2:
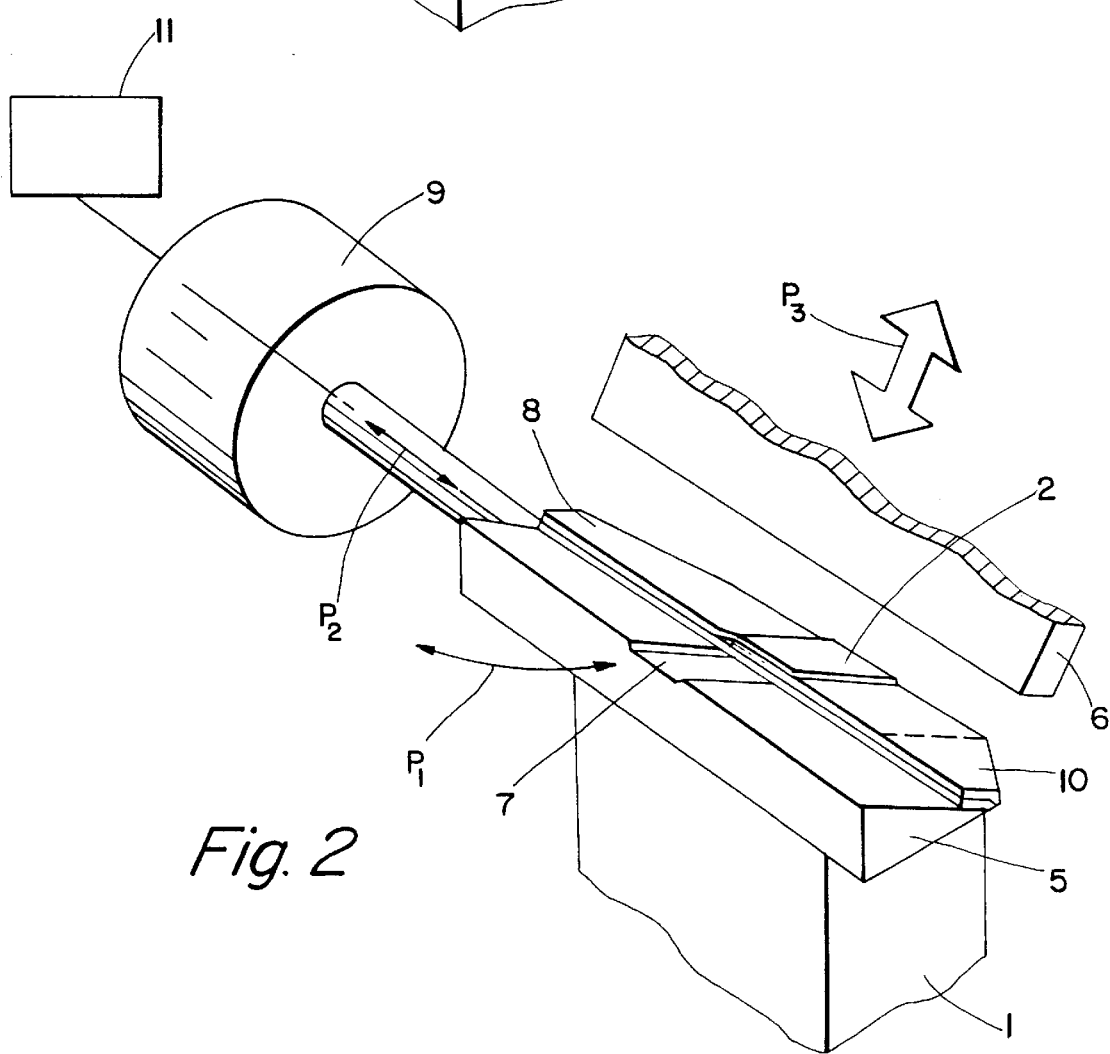

FIG. 2 shows the folded-carton package 1 immediately prior to sealing. The closing unit comprises an anvil 5 and a sonotrode 6, both of which are shown partially only. The anvil 5 comprises a recess 7 provided for the longitudinal seam; this recess 7 is aligned with the longitudinal seam 2 by means of the linear adjustability of the anvil 5. Preferably a stepping motor 9 (also only shown schematically) is used as a drive unit.

By means of the signals provided by the control unit 11, the stepping motor 9 moves the anvil 5 in the direction indicated by the double arrow $P_2$ until the recess 7 is aligned exactly with the longitudinal seam 2. Then the anvil 5 and the sonotrode 6 move along the double arrows $P_3$ into their sealing position, whereby the longitudinal seam 2 pushes the facing side wall into the recess 7 of the anvil 5. In this way, a reliably tight gable seam 8 is achieved, because both channel formation and burn marks in the area of the longitudinal seam 2 can reliably be prevented.

FIG. 2 shows that the cross section of the anvil 5 has a wedge-shaped design. In this way, residual stress in the folded-carton package 1, occurring in particular as a result of the lateral fastening of the folded down package ears 10, can be reduced to a minimum.

We claim:

1. A process for closing filled open-top folded-carton packages made from bottom-sealed tubular sections having a longitudinal seam on a wall of the carton which comprises:

prefolding an upper area of a filled carton into an upper seam wherein the upper seam is a ridge seam or a gable seam;

providing a moveable anvil having a recess to receive the longitudinal seam of the carton;

determining an actual position of the longitudinal seam of the carton by moving a tactile head along the wall of the carton on which the longitudinal seam is located;

aligning the anvil so that the recess of the anvil matches the actual position of the longitudinal seam of the carton; and sealing the upper seam on the anvil.

2. The process of claim 1 wherein determining the actual position of the longitudinal seam of the carton takes place before filling the carton.

3. The process of claim 1 wherein determining the actual position of the longitudinal seam of the carton takes place after filling the carton.

4. The process of claim 1 wherein determining the actual position of the longitudinal seam of the carton occurs immediately prior to sealing the upper seam.

5. The process of claim 1 wherein the tactile head moves perpendicular to a direction in which the carton is moving.

6. The process of claim 1 wherein the upper seam is a gable seam which is folded and sealed at an angle diverging from vertical.

7. The process of claim 6 wherein the angle is in the range of from 30° to 60° to vertical.

8. A device for sealing folded-carton packages made from bottom-sealed tubular sections having a longitudinal seam comprising:

a moveable anvil having a recess the receive the longitudinal seam of a carton;

a movable tactile head device to determine an actual position of the longitudinal seam of the carton;

a controller to control a position of the anvil so that the recess of the anvil matches the actual position of the longitudinal seam; and a sonotrode.

9. A device according to claim 8 wherein the controller is a microprocessor.

10. A device according to claim 8 further comprising a stepping motor to move the anvil.

11. A device according to claim 8 wherein the anvil has a wedge-shaped cross section.

\* \* \* \* \*

UNITED STATES PATENT AND TRADEMARK OFFICE
CERTIFICATE OF CORRECTION

PATENT NO. : 5,924,267
DATED : July 20, 1999
INVENTOR(S) : Bomer, et. al.

It is certified that error appears in the above-identified patent and that said Letters Patent is hereby corrected as shown below:

In column 4, line 27, please delete "recess the" and replace it with -- recess to -- .

Signed and Sealed this

Fourteenth Day of December, 1999

Attest:

Q. TODD DICKINSON

Attesting Officer

Acting Commissioner of Patents and Trademarks